April 17, 1928.
M. J. BRENNAN
AXLE GENERATOR BELT REMOVER
Filed March 18, 1926
1,666,592
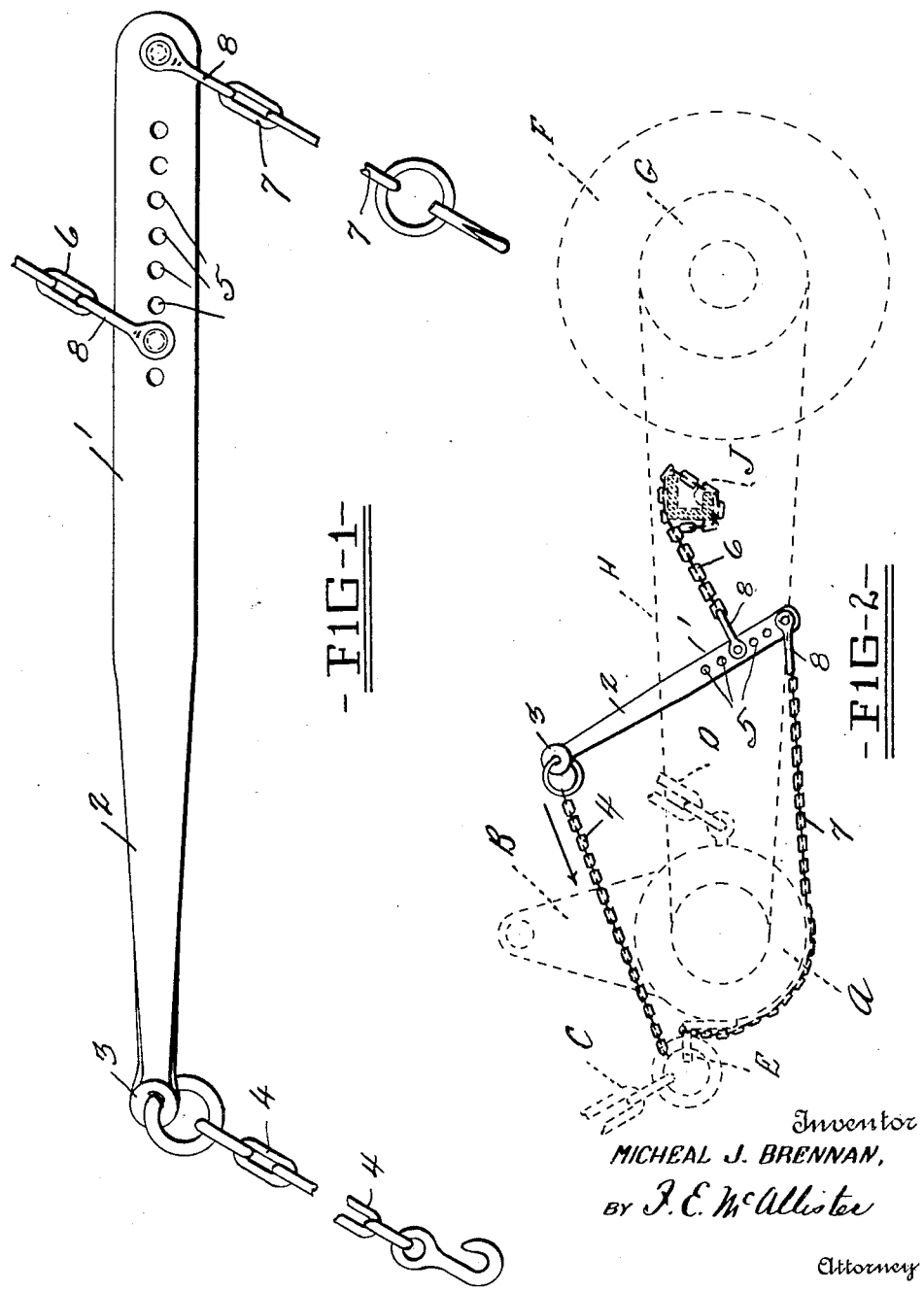
Inventor
MICHEAL J. BRENNAN,
BY J. E. McAllister
Attorney Patented Apr. 17, 1928.

1,666,592

UNITED STATES PATENT OFFICE.

MICHEAL J. BRENNAN, OF ST. PAUL, MINNESOTA.

AXLE-GENERATOR BELT REMOVER.

Application filed March 18, 1926. Serial No. 95,650.

My invention, in its broad aspect, has reference to improvements in means for adjusting the position of an axle generator with respect to its power element whereby to remove the belt between said power element and the generator. Generators of the type to which my invention especially applies are suspended from a base and held in place by stay chains, or the like, which allow for a certain amount of "give" so that the position of the generator will adapt itself, within limits, to that most favorable for transmission of power through the belt from the power element or axle. A generator of this character, cannot, however, be readily moved by the bare hands alone to a position where the belt may be easily removed, and my invention is designed to supply the necessary leverage for manipulating it. Furthermore, my invention is adapted by its construction for other purposes wherein by means of leverage it is necessary to move or adjust objects of great weight or resistance.

I provide a bar or lever with chains, or other attaching means or tackle, adjustably connected to one end thereof in spaced relationship so that they form a couple when the lever or bar is swung about a fulcrum; one of said chains is adapted to be connected to a fixed base, as for instance a truck frame, and the other to the generator. At the other end of the bar or lever I connect another chain, or the like, for engagement (after the position of the generator has been adjusted) with that generator stay chain exerting its influence against movement of the generator to the desired position. It will thus be seen that not only is my generator positively retained in position by one chain, but the other chain (that attached to the other end of the bar) serves to distribute the force upon the generator stay chain thereby more effectively supporting it.

Other and equally important objects and advantages of my invention may be briefly defined as follows; first, my invention is formed of but four elements, namely three chains, or attaching elements, and a bar or lever; second, the extent of the couple may be regulated, i. e., the point of engagement of one chain (or the other) with the lever may be changed at will, and; third my invention may be set up or detached without the use of tools and without loss of time.

While I have in the present instance defined for the sake of illustration a specific form of my belt remover it will be understood that I do not thereby desire to limit myself except as may be indicated by the scope of the claim appended hereunto and forming a part of this specification.

In the drawing wherein is illustrated the principal embodiments of my invention;—

Figure 1 is a detail view of my device, and

Figure 2 is a view showing the manner in which it is applied, a generator and axle being shown in dotted lines to avoid confusing the elements for which invention is claimed.

In the drawings wherein like characters of reference are used to designate like or similar parts through the several views;—

(A) designates a generator, (B) the support therefor, (C) and (D) the generator stay chains, (E) the lug for stay chain (C), (F) the truck wheel, (G) the axle pulley, (H) the belt, and (J) the truck frame. All of these elements are of conventional design and used in common practice, and are here shown in dotted lines to illustrate the application of my invention without inducing confusion as to what is claimed as new.

My belt remover is provided with an elongated lever or bar (1), tapered at one end as at (2) to an eye (3) in which is engaged the ring of a chain (4); the opposite end of the chain (4) being provided with a hook. That portion of the lever or bar (1) adjacent the other end is provided with a plurality of spaced, aligned openings (5), in any two of which are connected the chains (6) and (7); suitable fittings (8) being used for that purpose. As shown the end most opening (5) is spaced from the next adjacent opening more than the other openings are spaced from each other, and under normal conditions the chain (7) is engaged therein, while the chain (6) is attached in any one of the others. Hooks are also provided on the free ends of each of the chains (6) and (7). The tapered portion (2) serves as a hand grip in the manner which will be hereinafter described with reference to the operation of my device.

In applying my belt tightener, the chain (6) is engaged with the truck frame (J) by turning the end thereabouts and engaging the hook, the chain (7) is passed beneath the generator (A) and engaged with the lug (E). The lever or bar (1) is then grasped at the end (2) thereof and pulled in the direction of the arrow in Figure 2. This operation pulls against the chain (6) drawing the chain (7) backwardly to move the generator against the influence exerted by the stay chain (C) and its weight. Under ordinary conditions the lever is swung until it is almost parallel with the axis of the truck frame, and the chain (4) is then engaged with the ring of stay chain (C); the generator is then in such a position that the belt (H) is loose and may be readily removed. It will be noted that the generator is not only supported by chains (6) and (7) but also by chain (4).

While in the foregoing, there has been illustrated in the drawings and described in the specification such combination and arrangement of elements as constitute the preferred embodiments of my invention, it is nevertheless desired to emphasize the fact that interpretation of the invention should only be conclusive when made in the light of the subjoined claim.

I claim:—

An axle generator belt remover comprising a swingable lever, a chain one end of which is connected to said lever at any one of several points intermediate the length of the lever and spaced from its ends, said chain being connected at its other end to a fixed base to provide a fulcrum for the lever, two other chains each having one of their ends connected to the respective ends of the lever, one of said chains adapted to extend under and about an axle generator to move the same on swinging the lever, and the other chain adapted to extend over and about the axle generator to cooperate in supporting the load exerted by said generator after it has been moved, and the remaining ends of said last named chains adapted to be attached at points adjacent each other to an element of the generator assembly on the side of the generator removed from the fixed base.

In testimony whereof, I affix my signature hereunto.

MICHEAL J. BRENNAN.